United States Patent [19]
Morgan

[11] 4,250,776
[45] Feb. 17, 1981

[54] MACHINE TOOL
[76] Inventor: Weld Morgan, Ten Roxbury St., Worcester, Mass. 01609
[21] Appl. No.: 54,931
[22] Filed: Jul. 5, 1979
[51] Int. Cl.³ .......................... B23B 3/00; B23B 47/00
[52] U.S. Cl. ...................................... 82/2 D; 408/234
[58] Field of Search ................ 82/2 D; 408/234, 235, 408/236

[56] References Cited
U.S. PATENT DOCUMENTS

| | | | |
|---|---|---|---|
| 3,057,234 | 10/1962 | Heer | 82/2 D |
| 3,244,037 | 4/1966 | Ruehmer | 82/2 D |
| 3,264,905 | 8/1966 | Erikson | 408/234 |
| 3,983,769 | 10/1976 | McConnell et al. | 82/2 D |

*Primary Examiner*—Harrison L. Hinson
*Attorney, Agent, or Firm*—Norman S. Blodgett; Gerry A. Blodgett

[57] ABSTRACT

A machine tool having an extendable ram carrying a tool at its free end and having a stiffening beam extending along the ram and pivotally connected thereto at an intermediate location.

8 Claims, 12 Drawing Figures

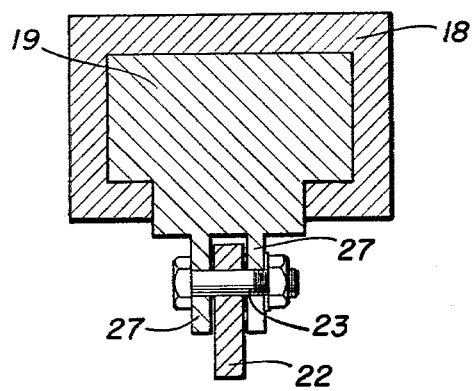
FIG. 5
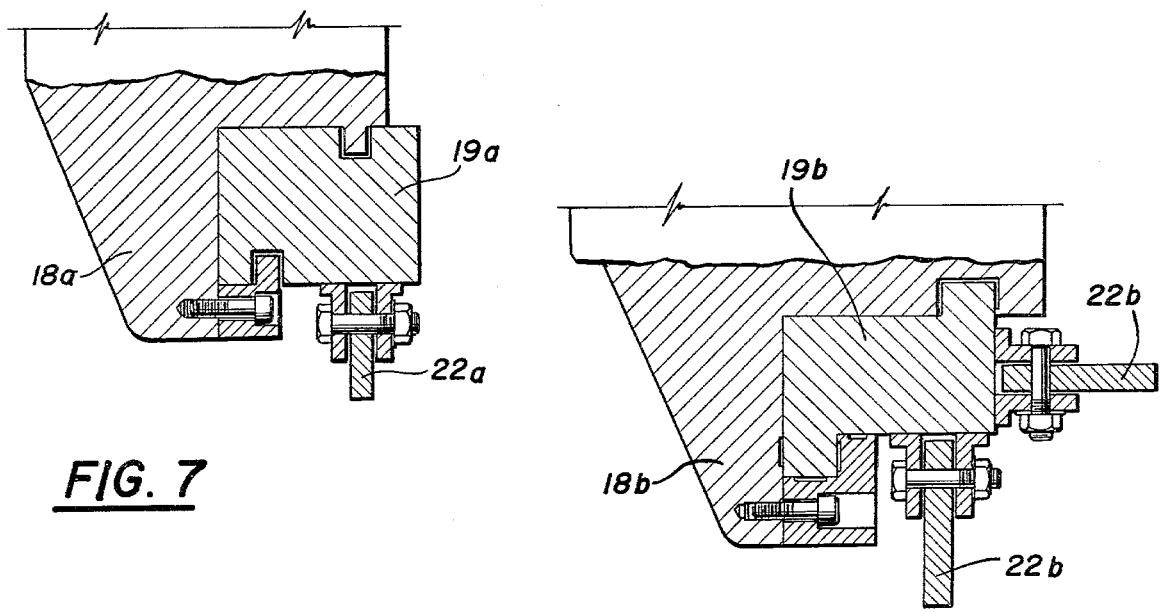
FIG. 7
FIG. 8
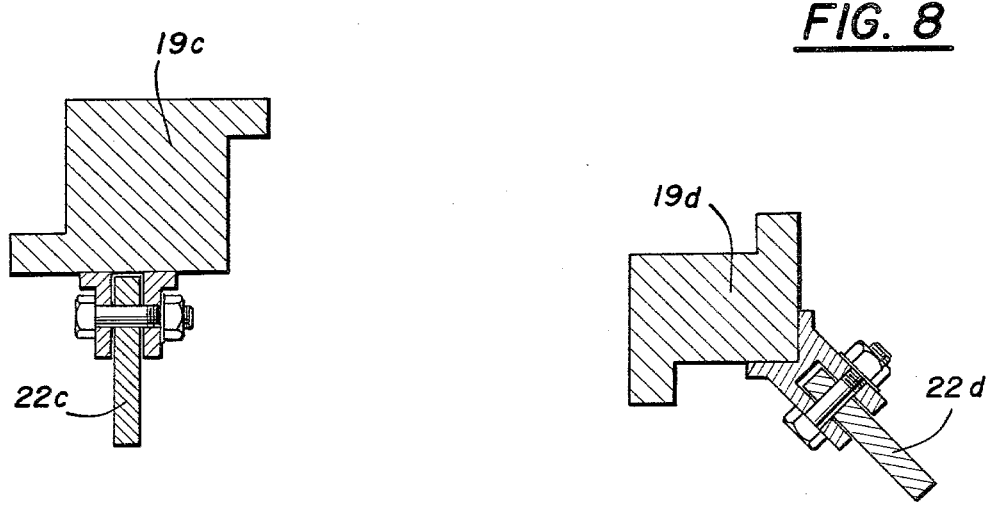
FIG. 9
FIG. 10

MACHINE TOOL

BACKGROUND OF THE INVENTION

In the construction of machine tools it is common practice to mount the cutting tool on the free end of a ram which is slidable in a bearing member during the machining operation. An example of such construction is found in vertical boring mills in which the workpiece is clamped on a rotating table and in which the ram advances vertically toward the workpiece to generate a surface of revolution. Since the supporting bearing for the beam remains relatively fixed during the advance of the ram, the unsupported portion of the ram changes in length during machining. This means that, even though the cutting force remains the same as the tool advances axially along the workpiece, the length of the cantilever represented by the unsupported length of the ram changes. For instance, if the surface of revolution is a bore, the ram advances vertically through the bore in an axial direction with the tool directed outwardly to generate the desired surface. If the amount of metal being removed from the surface of the bore is the same from top to bottom, the force on the tool will remain the same, but the length of the cantilever represented by the unsupported portion of the ram becomes longer and longer as the ram advances downwardly. This means that the amount of deflection of the ram will increase as it advances downwardly. This also means that the surface generated by the tool will be tapered in an undesirable manner. Complex control mechanisms can be used to move the ram and its tool laterally to compensate for such taper, but they are both expensive and delicate and do not entirely overcome the problem. These and other difficulties experienced with the prior art devices have been obviated in a novel manner by the present invention.

It is, therefore, an outstanding object of the invention to provide a machine tool in which the ram which carries the cutting tool is stiffened without substantially increasing its weight in an amount commensurate with the stiffness added and in which the amount of stiffness added can be adjusted to suit the circumstances with which it is to be used.

Another object of this invention is the provision of a machine tool in which means is provided to compensate for any variation in the amount of deflection of a ram due to change in its unsupported length.

A further object of the present invention is the provision of a machine tool having stiffening means for the ram, which means is simple and inexpensive and which is capable of a long life of useful service with a minimum of attention.

It is another object of the instant invention to provide a machine tool for generating a surface of revolution which surface is free of undesirable taper.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a base with a first portion adapted to carry a workpiece and a second portion extending at a right angle to the first portion, there being a guide means mounted on the second portion. A ram is slidably mounted in the guide means for longitudinal movement toward and away from the first portion, the end of the ram adjacent the first portion being adapted to carry a cutting tool. A stiffening beam which extends along the ram is pivotally connected thereto at an intermediate portion. Contact elements are located at the ends of the beam for engagement with the ram.

More specifically, the machine tool is intended to generate a surface of revolution on the workpiece and a driven table is carried on the first portion, the table including means for holding the workpiece and rotating it about the axis of the surface of revolution. The beam is tapered from a relatively large cross-sectional area in the intermediate portion to relatively small cross-sectional areas at the ends.

BRIEF DESCRIPTION OF THE DRAWINGS

The character of the invention, however, may be best understood by reference to one of its structural forms, as illustrated by the accompanying drawings, in which:

FIG. 5 is a horizontal sectional view of the machine tool taken on the line V—V of FIG. 3, FIGS. 7, 8, 9, and 10 show horizontal cross-sectional views of various modified forms of the invention.

DESCRIPTION OF THE PREFERRED EMBODIMENT

Figure 1:
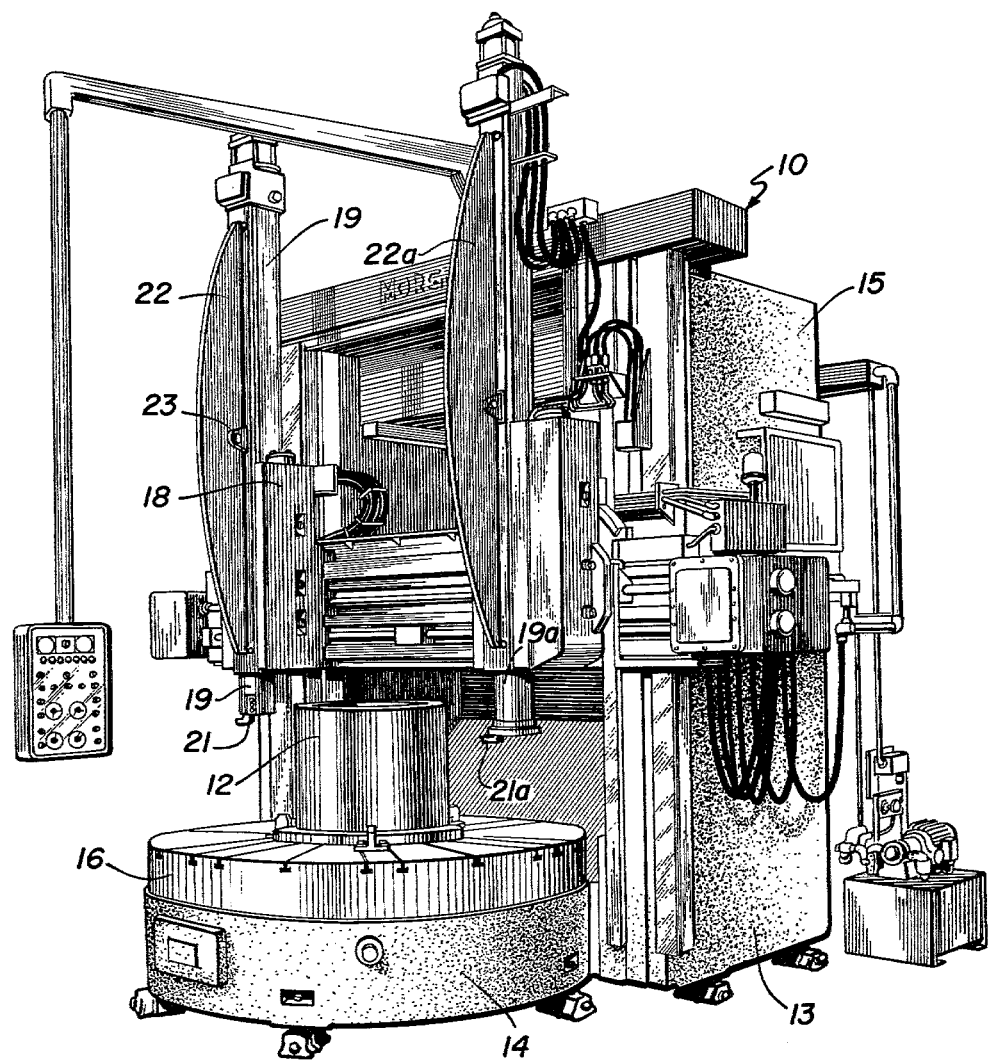
FIG. 1 is a perspective view of a machine tool incorporating the principles of the present invention.
Figure 2A:
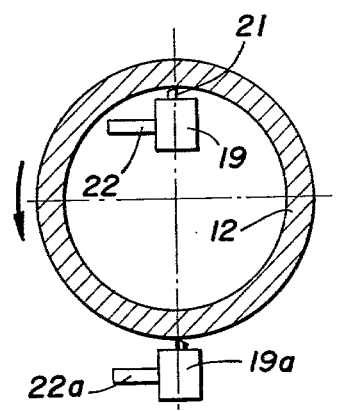
FIG. 2a is a somewhat schematic horizontal sectional view of the machine tool taken on the line II—II of FIG. 2, FIGS. 3 and 4 are side elevational views of portions of the machine tool showing two different conditions thereof.
Figure 2:
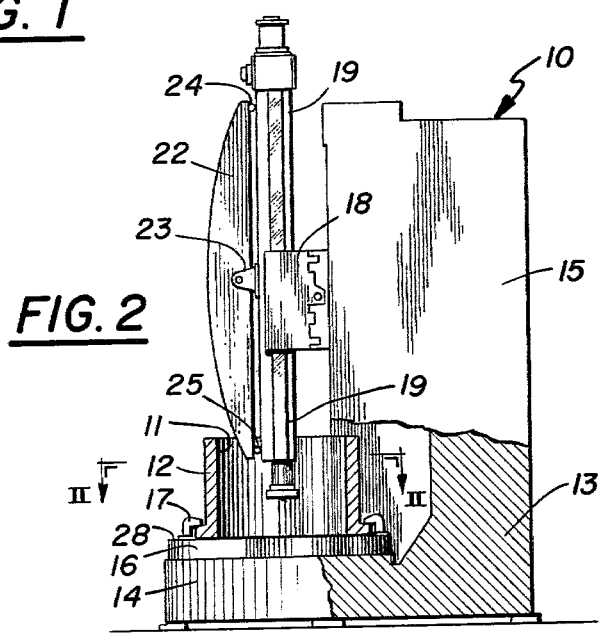
FIG. 2 is a side elevational view of the machine tool.

Referring first to FIGS. 1 and 2, wherein are best shown the general features of the invention, the machine tool, indicated generally by the reference numeral 10, is shown in use generating a surface of revolution 11 on a workpiece 12. The machine tool is provided with a base 13 having a first portion 14 adapted to carry the workpiece and a second portion 15 extending at a right angle to the first portion. A driven rotary table 16 is carried on the first portion and includes clamps 17 for holding the workpiece, so that it can be rotated about the axis of the surface of revolution 11.

A guide 18 in the form of a saddle is adjustably mounted on a cross-rail forming part of the second portion 15 and a ram 19 is slidably carried in the guide for vertical longitudinal movement toward and away from the first portion 14. The lower end of the ram 19 is adapted to carry a cutting tool 21. A stiffening beam 22 extends along the ram and is pivotally connected thereto at an intermediate portion by means of a pivot pin 23. The upper and lower ends of the beam are provided with contact elements 24 and 25, respectively, which engage the surface of the ram.

The table 16 has a horizontal surface 28 to support the workpiece 12 with the axis of the surface of revolution 11 extending vertically. In this embodiment, therefore, the ram 19 and the beam 22 extend in a generally vertical direction.

Figure 3:
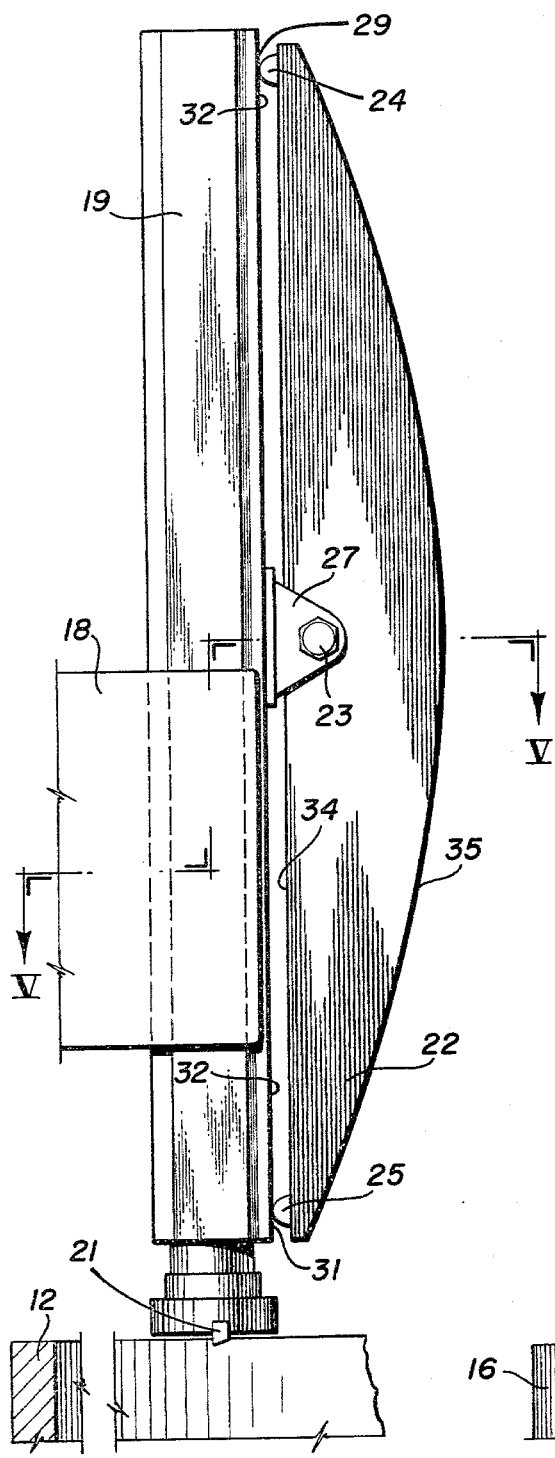
Figure 4:
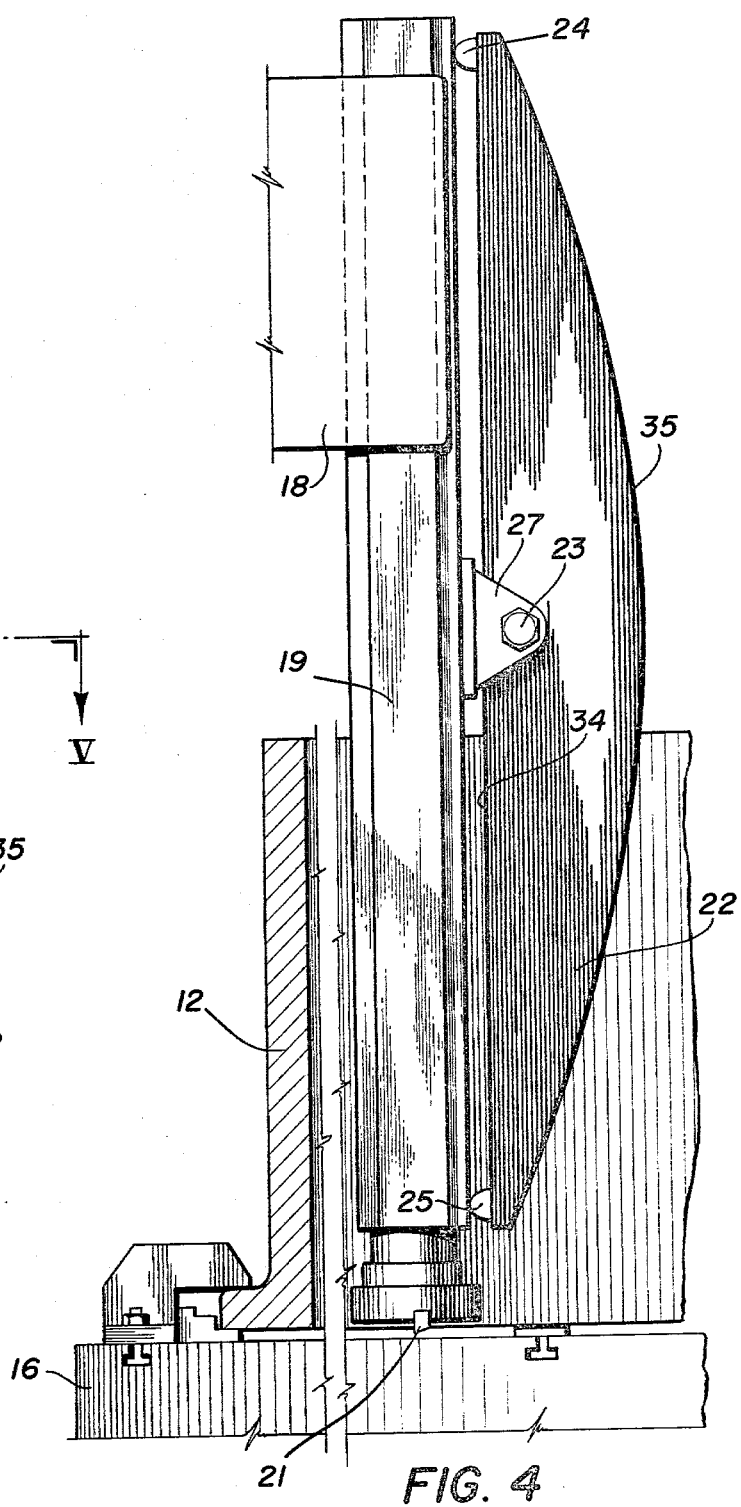

As is evident in FIGS. 3 and 4, the beam 22 is tapered from a relatively large cross-sectional area in the intermediate portion to a relatively small cross-sectional area at the ends. In the preferred embodiment the beam takes the general shape of a segment of a circle as defined by a straight chord and a portion of the periphery of the circle. The contact elements 24 and 25 are provided with cylindrical surfaces 29 and 31, respectively, while the ram in the area that is contacted by these contact surfaces is provided with a flat surface 32.

In FIG. 5 it can be seen that the guide 18 is provided with inner bearing surfaces that envelope the ram 19. These bearing surfaces provide for easy sliding of the ram therethrough, while providing for accurate location of the ram within the enclosure. The ram is provided with outwardly extending ears 27 through which the pivot pin 23 extends, which ears embrace the opposite side surfaces of the beam 22.

The operation of the apparatus will now be readily understood in view of the above description. As the various motors of the machine tool 10 are energized, the table 16 and the workpiece 12 rotate about the axis of the surface of revolution 11 which is to be generated. As the workpiece is rotated, the left-hand ram 19 is moved downwardly by a hydraulic cylinder or the like (not shown), so that the tool 21 engages the workpiece and generates the surface 11. In the illustration, the tool is directed laterally parallel to the front face of the upwardly-extending second portion 15 of the body of the machine tool, i.e., toward the portion of the surface 11 normally to the left of the operator. As the tool engages the workpiece, a force is directed at the bottom end of the ram 19 in the direction away from the second position. This force increases rapidly from zero to a large amount as the tool makes complete entrance into the material that is to be removed from the workpiece. If the unfinished surface of the workpiece is cylindrical and is perfectly concentric with the surface 11 that is to be finished, the amount of material to be removed at the top and at the bottom of the bore will be approximately the same. This means that the cutting force exerted on the tool would be approximately the same at the top and the bottom of the bore in the absence of deflection of the ram. However as the ram 19 moves downwardly through the guide 18, the lower, unsupported portion of the ram (which carries the tool 21) becomes longer and longer. Considering the ram as a free body at any given time, which body is clamped at its upper portion and which is free at its bottom portion, it can be treated as a cantilever for the purpose of calculating the deflection at the lower end. In the absence of the beam 22, the ram would, therefore, be increasingly deflected as it advanced into the bore in the workpiece. This means that a tapered surface would be formed, rather than the desired cylindrical surface 11. Furthermore, it would mean that the amount of such taper would be uncontrollable. However, in the present case, any deflection of the lower end of the ram will cause the surface 32 to press against the lower contact element 25. This slight deflection will cause the beam 22 to attempt to rotate about the pivot pin 23 and to press the contact element 24 against the surface 32 of the ram 19 at the upper portion thereof. It can be seen from observing FIGS. 3 and 4 that, when the unsupported lower portion of the ram 19 is large and flexible, the unsupported upper portion is short and stiff. The reverse situation is also true. The present invention takes advantage of this fact to produce a desirable stiffness in the combination of ram and beam which assures that the deflection of the lower end remains the same irrespective of how far into the bore it extends. In other words, when the lower end of the beam is short and stiff, the upper end of the ram and beam is flexible and subject to a slight deflection. On the other hand, when the lower unsupported portion is flexible and deflectible, the upper portion is short and stiff. The fact that the beam 22 bridges the two halves of the ram provides for this mutual anti-deflection assistance of one end of the ram to the other. The result is that the ram is capable of generating surfaces of revolution whose accuracy is not effected by an advance of the ram along the workpiece. Furthermore, variations in the amount of material to be removed to generate the surface of revolution are not duplicated on the finished surfaces, as was true in the past. Since the rough surface from which material is to be removed is often considerably less accurate in geometric formation than the desired finished surface, this is an important attribute of the present invention.

Figures 6, 6A:
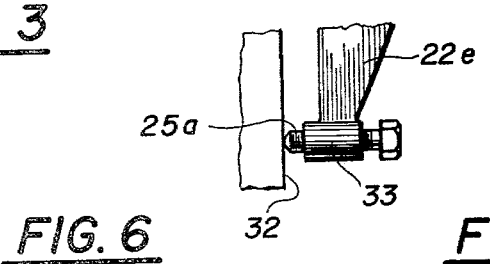
FIG. 6 is a side elevational view of a portion of a modified form of the machine tool.
FIG. 6a is a vertical sectional view of a portion of another modification of the invention.

FIG. 6 shows a contact element 25a which is threaded through a hub 33 on the lower end of the ram 22e. In this way, the beam can be prestressed to bring about a desired transfer of forces from the top to the bottom of the ram.

FIG. 6a shows the screw in tension, rather than in compression, and this is the arrangement that would be used when the ram is being stressed to bend it away from the beam, as would be true if the O.D. were being generated on the ram 19a in FIG. 2a.

FIGS. 7, 8, 9, and 10 illustrate ways in which the guide ram and beams can be placed in different geometric conformation to provide for various kinds of machining operations. In FIG. 7 the guide 18a is engaged with the ram 19a in the front-to-back relationship. FIG. 8 shows a situation where the guide 18b envelopes approximately two sides of the ram 19b, leaving a corner of the ram exposed. In that case, two mutually right angular stiffening beams 22b are provided. This causes the ram to be stiffened in two mutually right-angular directions, side-to-side and front-to-rear, as well as in a torsional situation. FIG. 9 shows the manner in which the beam 22c stiffens a ram 19c which is intended to be supported along its sides. FIG. 10 shows a manner in which a stiffening beam 22d can be provided on a corner of the beam 19d to give it stiffening action in a diagonal direction, thus, stiffening it in the front-to-rear, as well as the side-to-side.

It is obvious that minor changes may be made in the form and construction of the invention, without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. In a machine tool having a base with a first portion adapted to carry a workpiece and a second portion extending at a right angle to the first portion and having a guide means mounted in the second portion,
   (a) a ram slidably mounted in the guide means for longitudinal movement toward and away from the first portion, the end of the ram adjacent the first portion being adapted to carry a cutting tool,
   (b) a stiffening beam extending along the ram and being pivotally connected thereto at an intermediate location, and (c) contact elements located at the ends of the beam for contact with the ram.

2. Machine tool, comprising:
(a) a base including a first portion adapted to carry a workpiece and a second portion extending at a right angle to the first portion,
(b) guide means mounted on the second portion,
(c) a ram mounted in the guide means for longitudinal movement toward and away from the first portion, the end of the ram adjacent the first portion being adapted to carry a cutting tool, and
(d) a stiffening beam extending along the ram, being pivotally connected thereto at an intermediate portion, and having contact elements at its ends which contact the ram.

3. Machine tool for generating a surface of revolution on a workpiece, comprising:
(a) a base including a first portion adapted to carry the workpiece and a second portion extending at a right angle to the first portion,
(b) a driven table carried on the first portion and including means for holding the workpiece and rotating it about the axis of the surface of revolution,
(c) guide means mounted on the second portion,
(d) a ram slidably mounted in the guide means for longitudinal movement toward and away from the first portion, the end of the ram adjacent the first portion being adapted to carry a cutting tool, and
(e) a stiffening beam extending along the ram, being pivotally connected thereto at an intermediate portion, and having contact elements at its ends which contact the ram.

4. Machine tool as recited in claim 3, wherein the table has a horizontal surface to support the workpiece with the axis of the surface of revolution vertical, and wherein the ram and beam extend in a generally vertical direction.

5. Machine tool as recited in claim 3, wherein the beam is tapered from a relatively large cross-sectional area in the intermediate portion to a relatively small cross-sectional area at the ends.

6. Machine tool as recited in claim 3, wherein the contact elements have cylindrical contact surfaces and the ram has flat surfaces engaged by the contact surfaces.

7. Machine tool as recited in claim 3, wherein one of the contact elements is threadedly engaged with the beam to provide for selected initial stress of the beam.

8. Machine tool as recited in claim 3, wherein the beam has the shape of a segment of a circle defined by a straight line chord and the portion of the periphery of the circle between the ends of the chord.

* * * * *